US010441968B2

(12) United States Patent
Barth et al.

(10) Patent No.: US 10,441,968 B2
(45) Date of Patent: Oct. 15, 2019

(54) SUBSTRATES COATED WITH WEAR RESISTANT LAYERS AND METHODS OF APPLYING WEAR RESISTANT LAYERS TO SAME

(71) Applicant: UNITED TECHNOLOGIES CORPORATION, Farmington, CT (US)

(72) Inventors: Robert A Barth, South Windsor, CT (US); Wayde R. Schmidt, Pomfret Center, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 283 days.

(21) Appl. No.: 14/814,124

(22) Filed: Jul. 30, 2015

(65) Prior Publication Data

US 2016/0008846 A1 Jan. 14, 2016

Related U.S. Application Data

(62) Division of application No. 13/216,954, filed on Aug. 24, 2011, now abandoned.

(51) Int. Cl.
*B05D 3/00* (2006.01)
*B32B 43/00* (2006.01)
(Continued)

(52) U.S. Cl.
CPC ................. *B05D 1/12* (2013.01); *B05D 5/00* (2013.01); *B05D 7/50* (2013.01); *B05D 7/54* (2013.01);
(Continued)

(58) Field of Classification Search
CPC ............... B05D 1/12; B05D 7/50; B05D 7/54
See application file for complete search history.

(56) References Cited

U.S. PATENT DOCUMENTS 3,415,376 A * 12/1968 Smith ..................... A47J 43/22 209/236
3,811,919 A 5/1974 Lescop et al.
(Continued)

FOREIGN PATENT DOCUMENTS

EP 0196207 A2 10/1986
EP 2412771 A2 2/2012
WO WO 2010014929 A2 * 2/2010 ............ B05D 5/063

OTHER PUBLICATIONS

European Search Report for European Application No. 12181557 dated Dec. 14, 2012, 7 pages.

*Primary Examiner* — Michael P Wieczorek
(74) *Attorney, Agent, or Firm* — Cantor Colburn LLP

(57) ABSTRACT

Components with improved erosion resistance are disclosed. A surface of the component or a substrate of the component is modified by coating the substrate with an elastomer layer. The elastomer layer is then modified by embedding hard particles onto an outer side of the elastomer layer. The hard particles exhibit higher fractured toughness providing enhanced erosion protection. The elastic properties of the elastomer experience little reduction because the surface embedded particles are located only at the outer side or outer surface of the elastomer layer. Therefore, the bond between the inner side of the elastomer layer and the substrate or component surface is not interfered with and the potential for electro-chemical corrosion and poor adhesion are not increased by the presence of the hard particles as the hard particles are located away from the inner face between the elastomer layer and the substrate.

15 Claims, 1 Drawing Sheet

(51) Int. Cl.
*B05D 1/12* (2006.01)
*B05D 5/00* (2006.01)
*B05D 7/00* (2006.01)

(52) U.S. Cl.
CPC ...... *B05D 2425/01* (2013.01); *B05D 2490/50* (2013.01); *B05D 2601/20* (2013.01); *Y10T 428/2495* (2015.01); *Y10T 428/25* (2015.01); *Y10T 428/265* (2015.01); *Y10T 428/3154* (2015.04); *Y10T 428/31504* (2015.04); *Y10T 428/31551* (2015.04); *Y10T 428/31598* (2015.04); *Y10T 428/31605* (2015.04); *Y10T 428/31609* (2015.04); *Y10T 428/31663* (2015.04); *Y10T 428/31725* (2015.04); *Y10T 428/31765* (2015.04)

(56) References Cited

U.S. PATENT DOCUMENTS

| | | | | |
|---|---|---|---|---|
| 4,403,048 | A | 9/1983 | Blitstein et al. | |
| 4,614,686 | A | 9/1986 | Coke et al. | |
| 5,330,790 | A * | 7/1994 | Calkins | B05D 1/12 427/180 |
| 5,395,221 | A | 3/1995 | Tucker, Jr. et al. | |
| 6,341,747 | B1 * | 1/2002 | Schmidt | B64C 11/205 244/121 |
| 7,261,925 | B2 * | 8/2007 | Nesbitt | A47J 36/025 427/470 |
| 2004/0116792 | A1 | 6/2004 | Nesbitt | |
| 2011/0164961 | A1 | 7/2011 | Taylor | |

* cited by examiner

SUBSTRATES COATED WITH WEAR RESISTANT LAYERS AND METHODS OF APPLYING WEAR RESISTANT LAYERS TO SAME

CROSS-REFERENCE TO RELATED APPLICATIONS

This is a divisional application under 35 USC § 121 of U.S. patent application Ser. No. 13/216,954 filed on Aug. 24, 2011.

TECHNICAL FIELD

This disclosure relates generally to erosion resistant coatings for substrates and methods of applying such erosion resistant coatings to substrates.

BACKGROUND

The durability of helicopter rotor blades is dependent to a large extent on the erosion of the component by friction or by impact of finely divided solid or liquid particles. There is no way to avoid this friction or particulate impact during use of these components and therefore some means is needed to protect the components against erosion.

For example, the air through which the helicopter rotor blade rotates may contain particulate matter, such as sand. The size of the sand particles typically ranges from about 0.1 to 2000 microns and more typically from about 20 to 30 microns in diameter. If the air contains sand, the sand impinges upon the rotor blades as they rotate, thereby causing abrasion to the blades, or at least to portions thereof. Unless the blades are adequately protected, such repetitive abrasive contact can eventually cause the blades to erode.

The potential for erosion also exists if the rotor blades circulate through air containing water droplets. The size of water droplets ranges from about 1000 to 4000 microns and is typically about 2000 microns in diameter. Although the size of the water droplets is typically greater than the size of sand, under high velocity conditions, water droplets may behave similar to sand, thereby causing erosion to the rotating rotor blades.

Moreover, the combination of rain and sand can exacerbate the amount of abrasion and/or erosion. As a result, when translating a component through air comprising both rain and sand, the potential for erosion further increases.

The potential for erosion is also a function of the force at which the particulate matter impacts the rotor blade. Specifically, as the impact force increases, so does the potential for erosion. The force at which the particulate matter impacts the rotor blade is dependent upon the geometric shapes of both the rotor blade and the impacting particle and their relative velocities. For example, the leading edge of a rotor blade is the portion of the blade that first cleaves through the air. Therefore, the leading edge is the portion of the blade most susceptible to erosion caused by the abrasive contact of particulate matter.

The amount of erosion to the rotor blade is also a function of the velocity at which the blade impacts the particulate matter or vice versa. In other words, the potential for erosion increases as the speed of the blade increases. For example, because a rotor blade typically rotates around a central axis, the velocity of the rotor blade, relative to the air, differs along the leading edge of the blade. More specifically, the velocity at a point on a blade is equal to the product of the distance from the center rotational axis and the rotational velocity. As the distance from the rotational axis along the leading edge increases, so does the rotational velocity. The outboard tip of the rotor blade is the furthest from the rotational axis. Therefore, the potential for erosion is greatest at the outboard tip of the leading edge of the rotor blade.

Various techniques have been attempted to minimize the amount of erosion to the leading edge of rotor blades. One technique includes adhesively bonding an appropriately shaped piece of ductile metal onto the leading edge of the blade, such that the ductile metal is an integral part of the blade. The ductile metal leading edge is typically constructed of nickel, which provides increased wear resistance. The extended exposure of the nickel to the impinging particulate matter, however, causes the ductile metal leading edge to erode. The eroded nickel must, therefore, be replaced. Because the ductile metal leading edge is adhesively bonded to the blade, replacing the ductile metal leading edge requires a certain amount of time and skill, which is not typically available in the field.

Repairs that are performed in the field are referred to as "field level" repairs because such repairs require an acceptable amount of time and a minimal amount of skill to complete. Repairs requiring an extended amount of time and a heightened skill level occur back at the aircraft depot and are referred to as "depot" repairs. Depot repairs are undesirable because depot repairs increase the amount of time that the aircraft is unavailable in comparison to a field level repair. Because the replacement of the ductile metal leading edge is considered a depot repair, bonding ductile metal onto the leading edge of a rotor blade is an undesirable technique for minimizing erosion.

One type of "field level" repair technique for improving a rotor blade's wear resistance includes applying an elastomeric material to the leading edge of the blade. Typically, the elastomeric material is applied to the leading edge as a tape. As the tape becomes worn, it can quickly and easily be removed, and a new layer of tape can be applied. Unfortunately, the elastomeric tape must be replaced more frequently than a nickel leading edge and the ability of the elastomer to resist erosion caused by the combined rain and sand is less than that of nickel. Specifically, the elastomeric tape fails to adequately absorb the impact energy of the particulate matter. Without adequate absorption capabilities, the elastomer fails to dissipate the impact energy, thereby allowing the particulate matter to erode the elastomer. Without frequent replacement of the elastomeric tape, the leading edge of the rotor blade remains unprotected.

In an attempt to supplement the deficiencies of elastomeric tape, current designs include particles disposed in the elastomer layer. The particles are mixed in with the elastomer material before it is cured onto the substrate. Unfortunately, the particles at the interface of the elastomer layer and the substrate can cause poor bonding to the substrate and/or electrochemical corrosion problems such as a galvanic coupling. Further, the embedded particles can adversely affect the elastic properties of the elastomer coating thereby reducing the ability of the elastomer coating to absorb energy from particles in the air, such as sand, water droplets and other debris.

SUMMARY OF THE DISCLOSURE

To address the above problems, an improved component is disclosed which comprises a substrate comprising an outer surface. The outer surface is at least partially covered by an elastomer layer. The elastomer layer has an inner side that is bonded to the outer surface of the substrate and an outer side that is at least partially embedded with a plurality of particles.

Another improved component is disclosed which comprises a substrate having an outer surface. An elastomer layer is affixed to the outer surface of the substrate. The elastomer layer is fabricated from an elastomer that is selected from the group consisting of a polyurethane, a polyurea, a silicone and a fluoropolymer. The elastomer layer has an outer side disposed opposite the elastomer layer from the substrate and an inner side that is affixed to the outer surface of the substrate. The outer side of the elastomer layer is embedded with particles and the inner side of the elastomer layer is free of particles. The particles are fabricated from a material selected from the group consisting of alumina, silicon carbide, silicon nitride, boron carbide, tungsten carbide, steel alloys, nickel alloys, diamond, chromium carbide, mullite, zirconia, yttria stabilized zirconia, magnesium stabilized zirconia and combinations thereof.

A method for improving the erosion resistance of a substrate is also disclosed. The method comprises coating the substrate with at least one elastomer layer. The at least one elastomer layer includes an inner side that engages the substrate and an outer side disposed opposite the at least one elastomer layer from the inner side. The method further includes partially curing the at least one elastomer layer. The method also further includes applying particles to the partially-cured at least one elastomer layer so the particles embed into the outer side of the elastomer layer but do not pass through the elastomer layer to the inner side of the elastomer layer. The embedded particles can be used to control the surface energy of the exposed layer as measured by contact angle using standard methods.

DETAILED DESCRIPTION

Figure 1:
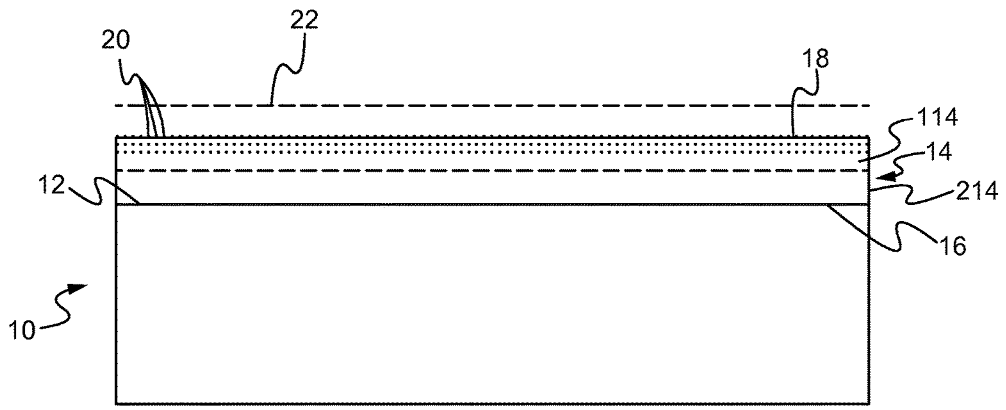
FIG. 1 is a side sectional view of a substrate coated with an elastomer layer that includes an outer side embedded with particles (surface embedded particles or SEPs).

Referring to FIG. 1, a substrate 10 is illustrated that includes an outer surface 12 that is at least partially covered by an elastomer layer 14. The elastomer layer 14 includes an inner side 16 that covers, is bonded to, affixed to or engaged with the outer surface 12 of the substrate 10. The elastomer layer 14 also includes an outer side 18 that is at least partially covered with a plurality of particles 20. An additional embodiment is also disclosed in FIG. 1 which includes dual elastomer layers 114, 214. In this example, the lower elastomer layer 214 can be applied to the outer surface 12 of the substrate 10 and may be allowed to cure. Then, the upper layer 114 is prepared and, optionally, the particles 20 may be mixed with the elastomer of the upper layer 114 and applied to the lower layer 214 thereby providing a dual layer 114, 214 structure wherein the outer layer 114 includes the plurality of hard particles but which cannot migrate to the inner layer 214 as the inner layer 214 is cured or at least substantially cured by the time the outer layer 114 is applied onto the inner 214. The properties of the layers 14, 114 and 214 can be selected to provide a preferred combination of bonding, erosion protection and thermal and environmental resistance to the coated substrate 10. The elastomer layers 114 and 214 may be the same or different elastomeric materials.

Other techniques for applying the particles 20 to the elastomer layer 14 include partially-curing the elastomer layer 14 and spraying or pressing the particles 20 onto the outer side 18 of the partially-cured elastomer layer. The particles 20 may also be strategically placed on the outer side 18 of the elastomer layer 14 by using a screen or mesh 22 and pressing or spraying or otherwise delivering the particles 20 through the screen or mesh 22 onto the outer side 18 of the partially-cured elastomer layer 14.

Depending on the type of elastomer and desired properties, the particles 20 may be fabricated from materials selected from the group consisting of alumina, silicon carbide, silicon nitride, boron carbide, tungsten carbide, steel alloys, nickel alloys, diamond, chromium carbide, mullite, zirconia, yttria stabilized zirconia, magnesium stabilized zirconia and combinations thereof. If the particles 20 and the elastomer layer 14 are not inherently compatible, it may be necessary to add a known coupling agent to the elastomer in order to combine the elastomer and the particles. For that matter, the elastomer layer 14 should be selected so that it is compatible with the substrate 10 and, when cured onto the substrate 10, the elastomer layer 14 should be mechanically and/or chemically bonded to the substrate 10.

It is preferable that the elastomer has a strain to failure of at least 20% and a tensile strength of at least 1,000 PSI. Even more preferable, the elastomer may have a strain to failure of at least 100% and a tensile strength of at least 3,000 PSI. It is still more preferable that the elastomer has a strain to failure of at least 1000% and a tensile strength of at least 5,000 PSI. Elastomers such as polyurethanes, polyureas, silicones or silicone rubbers and fluoropolymers can satisfy these requirements. Other suitable elastomers may include, but are not limited to natural rubber, polyurethanes, chlorosulfonated polyethylene, chlorinated polyethylene and ethylene-propylene copolymers and terpolymers.

One example of a possible polyurethane is a product manufactured by AIR PRODUCTS under the trade name Airthane®. Examples of potentially suitable fluoropolymers include those manufactured by Dupont Dow Elastomers under the tradenames Viton® and Kalrez®. E.I. Dupont de Nemours Company also manufactures Teflon® fluoropolymer. Another example of a possible fluoropolymer includes that which is manufactured by the Minnesota, Mining & Manufacturing Company (3M) under the tradenames Fluorel®. Further examples of potential elastomers include Engage® polyolefin, Ascium® and Hypalon® chlorinated polyethylenes, and Tyrin® chlorinated polyethylene, all manufactured by Dupont Dow Elastomers. Another example of a possible polymer is a fluorinated polymer, such as polychlorotrifluoroethylene manufactured by 3M under the tradename Kel-F®. Examples of a potential silicone include NuSil R-2180, fluorosilicone and polydimethylsiloxane.

It is preferable that the hard particles 20 have a diameter ranging from about 5 microns to about 3000 microns. It is even more preferable that the hard particles 20 have a diameter ranging from about 100 microns to about 1000 microns. It is especially preferable that the hard particles 20 have a diameter ranging from about 500 microns to about 800 microns. It is also preferable that the hard particles 20 have an aspect ratio ranging from about 1 to about 20. It is even more preferable that the hard particles 20 have an aspect ratio ranging from about 1 to about 10, and it is especially preferable that the hard particles 20 have an aspect ratio ranging from about 1 to about 5. It is also preferable that the hard particles 20 have favorable mechanical and chemical properties, such as high hardness, abrasion resistance, high modulus of stiffness, high compressive strength, water resistance, and thermal stability. It is also preferable that the hard particles 20 account for from about 1% to about 50% of the volume of the elastomer/particle layer 14. It is even more preferable that the hard particles 20 account for from about 1% to about 25% of the volume of the elastomer/particle layer 14, and it is especially preferable that the hard particles 20 account for from about 5% to about 20% of such volume.

Depending upon the type of elastomer and the desired properties, the hard particles may comprise a material from the group consisting of alumina, silicon carbide, silicon nitride, boron carbide, tungsten carbide, steel alloys, nickel alloys, diamond, chromium carbide, mullite, zirconia, yttria-stabilized zirconia, magnesium-stabilized zirconia and combinations thereof. It is desired to include particles having a hardness generally higher than that of incoming erodent particles such as sand.

The elastomer serves as a matrix for the hard particles, which add the desired physical properties to the elastomer, thereby increasing the toughness and/or stiffness of the elastomeric matrix. Incorporating hard particles into the elastomeric matrix allows an additional pathway for the elastomer to dissipate impact energy over a larger relative volume because the sizes of the particulate matter (sand or water) impacting the elastomer are significantly less than the size of the hard particles within the elastomeric matrix. It is anticipated that the smaller erodent particle will impact the reinforcement particle within the elastomer or with the elastomer itself. If the reinforcement particle is impacted, the force will be transferred into both the reinforcement particle and the elastomeric matrix. The elastomer layer(s) is, thereby, less susceptible to erosion than a pure elastomer. The particle-embedded elastomer layer 14, therefore, will typically have a longer useful life compared to a pure elastomer layer. The elastomer layer 14 will also have a longer life expectancy than an elastomeric matrix reinforced with conventional reinforcing particles because the disclosed elastomer layer 14 with hard particles 20 embedded on its outer side 18 can absorb a particulate matter's impact energy over a significantly greater volume. Applying the particle-coated or particle-embedded elastomer layer 14 onto a substrate such as an airfoil, rotor or fan, especially a leading edge, reduces the energy density absorbed by the elastomer layer 14, thereby reducing its potential for eroding which, in turn, increases the component's erosion resistance.

The particles 20 may be partially or totally embedded in the elastomer layers 14, 114 as illustrated in FIG. 1, but are most effective when particles are disposed partially on or just below the outer side 18 of elastomer layers 14, 114. The elastomer layers 14, 114 may have particles deposited to a depth ranging from about 1% to about 99% of the overall thickness of the layer or layers 14, 114. Other suitable particle depth ranges can range from about 1% to about 50% or from about 5% to about 10%. At least about 1% of the outer layer 14, 114 thickness would have embedded particles with an upper limit of about 99% of the outer thickness of the layers 14, 114 would have embedded particles. One preferred range is from about 5% to about 10% of the outer layer thickness.

Figure 2:
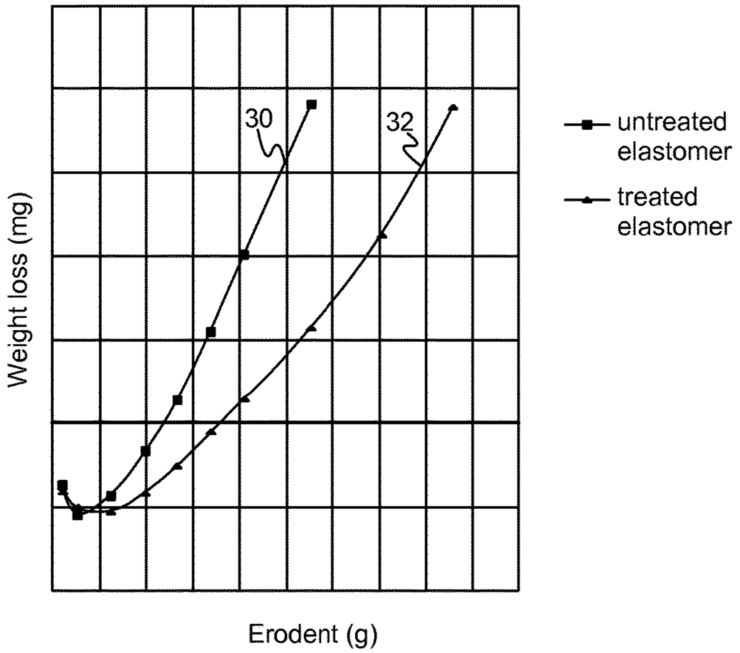
FIG. 2 compares, graphically, the mass of the erodent that engages the elastomer layer (x-axis) and the mass of the elastomer layer removed by the erodent (y-axis) for both an untreated elastomer layer and an elastomer layer treated with particles as illustrated in FIG. 1.

Turning to FIG. 2, simulated data for an untreated elastomer layer and a treated elastomer layer 14 is presented graphically. The line 30 represents an untreated elastomer layer that is being bombarded with an erodent in the form of sand particles and/or water particles. The initial dip in the curve is evidence of a weight gain as the erodent particles are embedded into the untreated elastomer layer. However, as the untreated elastomer layer erodes, it loses weight as indicated by the upswing of the curve 30. The curve 32 represents a treated elastomer layer 14 like that shown in FIG. 1. The treated elastomer layer 14 also gains weight as it is initially bombarded with particles, but at an initially slower rate than the untreated elastomer, and then slowly begins to lose weight as it erodes. The reader will note the substantial offset between the curves 30 and 32 thereby establishing that the treated elastomer layer 14 will take longer to erode than the untreated elastomer layer represented by the curve 30.

INDUSTRIAL APPLICABILITY

Various components that are susceptible to erosion by sand or dirt particles and/or water particles may be provided with a superior erosion-resistant coating in the form of an elastomer layer 14 with hard particles 20 embedded into or onto the outer side 18 of the elastomer layer 14. The inner side 16 of the elastomer layer 14 that engages the substrate 10 is free of particles and therefore the bond between the inner side 16 and the outer surface 12 of the substrate 10 will not be interfered with by the hard particles 20. Further, the risk of causing electro-chemical corrosion and/or adhesion problems at the interface between the inner sides 16 of the elastomer layer 14 and the upper surface 12 of the substrate 10 is avoided by keeping the hard particles 20 away from this interface.

The modified elastomer layer 14 as shown in FIG. 1 or the dual layer 114, 214 with the modified outer layer 114 can be applied to a variety of components including, but not limited to a propeller, a helicopter rotor blade, an airfoil, a compressor blade of a gas turbine, a fan blade of a gas turbine and a rotor blade of a pump, a rotor blade of a compressor, a fan blade of a heating-ventilation-air conditioning unit (HVAC) and other components as will be apparent to those skilled in the art.

What is claimed is:

1. A method of providing erosion resistance to a substrate by coating the substrate with at least one elastomer layer and controlling the surface energy of an exposed surface of the at least one elastomer layer, the method consisting of:

coating at least a portion of the substrate with at least one elastomer layer, the at least one elastomer layer including an inner side that engages the substrate and an outer side disposed opposite the at least one elastomer layer from the inner side, wherein the substrate comprises an airfoil;

partially curing the at least one elastomer layer; and applying the particles selected from the group consisting of alumina, silicon carbide, silicon nitride, boron carbide, tungsten carbide, steel alloys, nickel alloys, diamond, chromium carbide, mullite, zirconia, yttria-stabilized zirconia, magnesium-stabilized zirconia and combinations thereof and having a diameter of 5 to 3000 microns to the partially-cured at least one elastomer layer so the particles embed into the outer side of the elastomer layer but do not pass through the elastomer layer to an inner side of the elastomer layer and at least a portion of the particles are partially embedded.

2. The method of claim 1 wherein the particles are sprayed onto the partially-cured at least one elastomer layer.

3. The method of claim 1 wherein the particles are applied to the partially-cured at least one elastomer layer by placing a screen over the partially-cured at least one elastomer layer and pressing the particles through the screen to the partially-cured at least one elastomer layer.

4. The method of claim 1 wherein the partially-cured at least one elastomer layer includes a first layer that engages the substrate and a second layer disposed on the first layer and opposite the first layer from the substrate.

5. The method of claim 1 wherein the applying of the particles to the partially-cured at least one elastomer layer includes pressing the particles onto the outer side of the partially-cured at least one elastomer layer.

6. A method of applying an elastomer to a leading edge of an airfoil, consisting of:

coating the leading edge of the airfoil with a first uncured elastomeric material;

curing the first uncured elastomeric material to form a cured elastomeric layer, the cured elastomeric layer having an inner surface coupled to the leading edge of the airfoil;

coating the cured elastomeric layer with a second elastomeric material, the second elastomeric material having an outer surface disposed opposite the inner surface; and embedding hard particles selected from the group consisting of alumina, silicon carbide, silicon nitride, boron carbide, tungsten carbide, steel alloys, nickel alloys, diamond, chromium carbide, mullite, zirconia, yttria-stabilized zirconia, magnesium-stabilized zirconia and combinations thereof and having a diameter of 5 to 3000 microns into the outer surface.

7. The method of claim 6 wherein the second elastomeric material is the same as the first uncured elastomeric material.

8. The method of claim 6 wherein the second elastomeric material is different than the first uncured elastomeric material.

9. The method of claim 6, wherein the first uncured elastomeric material is selected from the group consisting of polyurethanes, polyureas, silicones, silicone rubbers, fluoropolymers, natural rubber, chlorosulfonated polyethylene, chlorinated polyethylene, ethylene octene copolymers and combinations thereof.

10. The method of claim 6, wherein the second elastomeric material is selected from the group consisting of polyurethanes, polyureas, silicones, silicone rubbers, fluoropolymers, natural rubber, chlorosulfonated polyethylene, chlorinated polyethylene, ethylene octene copolymers and combinations thereof.

11. The method of claim 6, wherein the hard particles have a diameter of to 100 to 1000 microns.

12. The method of claim 6, wherein the hard particles have a diameter of 500 to 800 microns.

13. A method of coating an airfoil, consisting of:

applying an elastomer to a surface of the airfoil to form an elastomeric layer, the elastomeric layer including an inner surface attached to the surface of the airfoil and an outer surface disposed opposite the inner surface;

entrenching hard particles selected from the group consisting of alumina, silicon carbide, silicon nitride, boron carbide, tungsten carbide, steel alloys, nickel alloys, diamond, chromium carbide, mullite, zirconia, yttria-stabilized zirconia, magnesium-stabilized zirconia and combinations thereof and having a diameter of 5 to 3000 microns into the outer surface; and curing the elastomeric layer to form a matrix.

14. The method of coating an airfoil according to claim 13, wherein the hard particles have an aspect ratio of one to twenty.

15. The method of coating an airfoil according to claim 13, wherein the hard particles have an aspect ratio of 1 to 5.

* * * * *